(12) United States Patent (10) Patent No.: US 8,577,733 B2
Atwater et al. (45) Date of Patent: Nov. 5, 2013

(54) METHOD AND SYSTEM FOR DYNAMIC ORDER FULFILLMENT

(75) Inventors: Beauford Atwater, Bernardsville, NJ (US); Munir Cochinwala, Basking Ridge, NJ (US); Josephine Micallef, Maplewood, NJ (US); John R. Wullert, II, Martinsville, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 1322 days.

(21) Appl. No.: 11/982,678

(22) Filed: Nov. 2, 2007

(65) Prior Publication Data

US 2009/0116626 A1 May 7, 2009

(51) Int. Cl.
*G06Q 30/00* (2012.01)
(52) U.S. Cl.
USPC .......................................... 705/26.1
(58) Field of Classification Search
USPC ....................... 705/26.1, 26.7, 27.1
See application file for complete search history.

(56) References Cited

U.S. PATENT DOCUMENTS

| | | | |
|---|---|---|---|
| 4,459,663 A | 7/1984 | Dye | 364/200 |
| 5,315,509 A | 5/1994 | Natarajan | 364/401 |
| 6,260,024 B1 | 7/2001 | Shkedy | 705/37 |
| 6,845,507 B2 | 1/2005 | Kenton | 719/314 |
| 7,039,597 B1 | 5/2006 | Notani et al. | 705/9 |
| 7,233,914 B1 * | 6/2007 | Wijaya et al. | 705/26.1 |
| 7,747,543 B1 * | 6/2010 | Braumoeller et al. | 705/330 |
| 7,748,543 B2 * | 7/2010 | Yang et al. | 211/41.3 |
| 2001/0011232 A1 * | 8/2001 | Peterson et al. | 705/26 |
| 2001/0034609 A1 * | 10/2001 | Dovolis | 705/1 |
| 2002/0042755 A1 | 4/2002 | Kumar et al. | |
| 2004/0044582 A1 * | 3/2004 | Chowdhary et al. | 705/26 |
| 2004/0107125 A1 | 6/2004 | Guheen et al. | |
| 2004/0111336 A1 * | 6/2004 | Argust et al. | 705/28 |
| 2004/0205016 A1 * | 10/2004 | Lin et al. | 705/37 |
| 2005/0246240 A1 | 11/2005 | Padilla | |
| 2006/0059107 A1 | 3/2006 | Elmore et al. | |

OTHER PUBLICATIONS

Dec. 2008—http://web.archive.org/web/20081217234132/http://www.gamestop.com/gs/help/Change_Order.aspx.*
R. Muller, U. Greiner, E. Rahm, "Agent Work: A Workflow System Supporting Rule-Based Workflow Adaptation," Data & Knowledge Engineering, vol. 51, Issue 2, pp. 223-256, Nov. 2004.
PCT Search Report from related application PCT/US08/82243; dated Dec. 29, 2008, 8 pages.
Extended European Search Report from related European Patent Application No. 08845617.3; dated Apr. 25, 2012; 6 pages.
Liendl, Article 94(3) EPC from related European Patent Application No. 08845617.3 dated Dec. 14, 2012; 4 pages.
Summons to attend oral proceedings pursuant to Rule 115(1) EPC from related European Patent Application No. 088456173 dated Jun. 14, 2013; 8 pages.

* cited by examiner

*Primary Examiner* — Matthew Zimmerman
(74) *Attorney, Agent, or Firm* — Fitch, Even, Tabin & Flannery LLP

(57) ABSTRACT

A system and method to enable dynamic partner selection and subsequent order fulfillment by a service provider is presented. The system and method has an order entry device for obtaining an order, a service specification corresponding to the order, a flow execution engine, a partner selector mechanism, at least one partner, and at least one component obtained from the service specification, the component being broadcast from the partner selector mechanism to the partner, who responds to the broadcast, such that all of the partner responses are optimized by the partner selector mechanism for execution by said flow execution engine to fulfill the order.

13 Claims, 3 Drawing Sheets

METHOD AND SYSTEM FOR DYNAMIC ORDER FULFILLMENT

FIELD OF THE INVENTION

The present invention relates generally to dynamic order fulfillment for communications, information and entertainment services, and, more specifically, to a system and method for enabling a service provider to coordinate among a federation or collection of suppliers and optimize order fulfillment.

BACKGROUND OF THE INVENTION

The delivery of communications, information and entertainment services is often driven by customer orders, where customers or users enter information that describes themselves, their preferences and the service(s) they wish to have. In many cases, the set of steps necessary to fulfill such orders is written in software code that is compiled and executed, and thus hard to modify in response to changing requirements. More recently, service providers have used workflow systems to automate the process of fulfilling these orders and have stressed flow-through, emphasizing the ability to process an order without human intervention, as the primary metric for assessing their operation. While flow-through is an effective measure of the service provider's efficiency in fulfilling orders, it does not directly reflect the customer's experience with receiving the service. Often the fulfillment of orders is complicated by the need for service providers to partner, or obtain goods and/or services from a plethora of suppliers, to deliver the requested service. For example, an end-to-end virtual private network service might involve a partnership between a long-haul carrier, who provides cross-country networking, and two access carriers who connect the long-haul carrier's networking points-of-presence with the actual customer locations.

A pre-programmed workflow-based approach offers limited flexibility in dealing with partners or suppliers. The operations for selecting partners are generally specified into the workflow definition and cannot readily adapt in a dynamic fashion to variations such as groups of partners offering different components, multiple partners offering similar capabilities or the addition of new partners with different capability sets. Thus these systems lead to static partnering arrangements that are not well suited for rapid response to dynamic market needs and improving the customer experience.

In U.S. Pat. No. 6,845,507, "Method and system for straight through processing", Kenton describes a mechanism for simplifying the manual creation of a workflow that manages processes that span disparate systems. While Kenton does not specifically address the concept of partnering, one could imagine that his disparate systems include both service provider and partner systems. Kenton describes a mechanism to make it easier for users to manually create flows that cross such boundaries, focusing primarily on the adaptors necessary to support messaging between the systems using various formats. Such a system could be used to manually define a workflow that would provide federated order fulfillment, but would not include dynamic, run-time partner selection.

In U.S. Pat. No. 7,039,597, "Method and system for managing collaboration within and between enterprises", Notani et al. describe a computerized mechanism to support workflow collaboration across enterprises. Their approach focuses on collaborating parties defining and executing a workflow. In the disclosed workflow management, the central process has a complete set of the software functions that make up the distributed workflow, and transmits these functions to other systems for execution. The computer-aided collaborative design operation of Notani et al., which can provide a speed improvement over manual techniques, is best suited for long-lived, static partnering arrangements, and does not facilitate dynamic partnering.

In U.S. Pat. No. 6,260,024, "Method and apparatus for facilitating buyer-driven purchase orders on a commercial network system", Shkedy describes an approach to pooling buyers' requirements into a transaction with one or more sellers. Shkedy's focus is on dynamically merging buyer demands as a means of improving negotiations with sellers, and does not address enabling sellers to team dynamically to meet the buyer's demands, as represented by the customer's order for a service.

In U.S. Pat. No. 5,315,509, "Artificial intelligence system for item analysis for rework shop orders", Natarajan describes a system for planning shop work schedules based on knowledge of the availability and location of required items. Natarajan's focus is on the manufacture of physical goods, and using the availability and location of physical parts to determine how to schedule repairs and/or changes in response to identified defects. It does not anticipate application to communications and information services that are not composed of physical goods. Furthermore, Natarajan does not address the concept of dynamic creation of the new instance, but rather posits that the "re-work order" identifies the item to be replaced and the replacement item, which can then be located.

In U.S. Pat. No. 4,459,663, "Data processing machine and method of allocating inventory stock for generating work orders for producing manufactured components", Dye describes a system for allocating the stock of physical parts to jobs and work orders on a dynamic basis. As with Natarajan, Dye does not anticipate application of these techniques to anything other than manufactured goods. Dye describes automatically generating orders for manufactured parts that are used in the creation of the ordered item. Dye does not address the dynamic aspects of selecting among multiple sources for these manufactured parts, or direct interactions with the manufacturers of these parts to determine information such as delivery dates.

There is also a body of work on general adaptation of workflows. For example, in "Agent Work: a workflow system supporting rule-based workflow adaptation," [Data & Knowledge Engineering archive, Volume 51, Issue 2 (November 2004), Pages: 223-256, ISSN: 0169-023X], Muller et al describe how a work flow can be adapted in response to feedback, exceptions and events based on a set of pre-defined rules. This type of adaptation is designed to address problems in the logic of the flow that could result in adverse outcomes, by, for example, altering steps in a patient care flow that dispense a specific medicine after the user is found to be allergic to it. Such adaptation can modify a set of steps, but does not provide a mechanism for interacting with partner entities to determine the optimum choices for dynamically creating or adapting a flow instance.

Hence, the prior solutions adapt work flows without the concept of dynamic partner selection. Limited flexibility in dealing with partners or suppliers is provided and no means for dynamically adapting to variations, such as groups of partners offering different components or the addition of new partners with different capability sets, is given. Dynamic systems use the adaptation to address faults and failures, rather than to select optimal partners. The systems that touch on some aspects of partnering do not envision that such partner selection can be dynamic. Similarly, concepts used in managing a supply chain have been applied most commonly to managing physical goods. However, the constraints associated with physical goods (e.g., shipping lead times) are a major impediment to dynamic partnering. Thus there exists a need for a system and method in which providers of communication, information and entertainment services can incorporate dynamic partnering arrangements enabling rapid response to dynamic market needs, and can combine dynamic selection of partnerships and implementation to achieve order fulfillment.

BRIEF SUMMARY OF THE INVENTION

The present invention advantageously provides a mechanism to enable dynamic partnering in the delivery or fulfillment of an order for communications services, where the selection of partners can be optimized to meet the specific conditions of a customer's order.

An inventive system and method to enable dynamic partner selection and subsequent order fulfillment by a service provider is presented. The system and method has an order entry device for obtaining an order, a service specification corresponding to the order, a flow execution engine, a partner selector mechanism, at least one partner, and at least one component obtained from the service specification, the component being broadcast from the partner selector mechanism to the partner, who responds to the broadcast, such that all of the partner responses are optimized by the partner selector mechanism for execution by said flow execution engine to fulfill the order.

In an embodiment, the partners responding to the broadcast include the service provider. In an embodiment, if one of the partners does not perform the response, another partner can be chosen to perform the response.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A system and method to enable dynamic partner selection and the subsequent order fulfillment is presented. A service being offered, or available for ordering, is represented as a hierarchical collection of components. These components represent the basis for partnering, that is, partners provide capabilities represented by the components. A service instance, or service order, can be created dynamically by assembling components from various partners. This component-based dynamic service assembly process can be implemented in a manner that provides several unique advantages.

Figure 1:
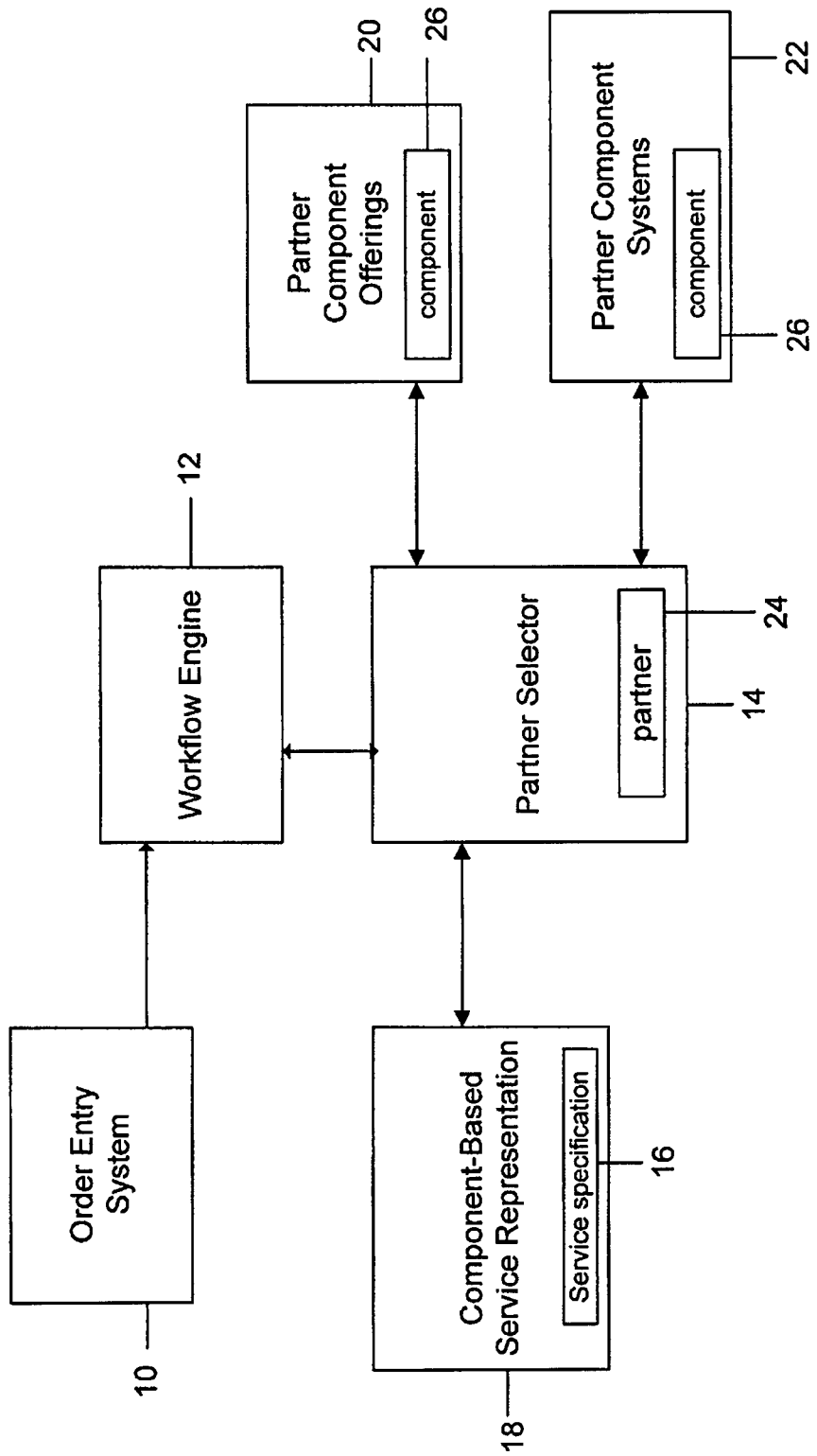
FIG. 1 illustrates architecture for dynamic, federated, order fulfillment.

FIG. 1 illustrates the architecture for implementing the dynamic partner selection and order fulfillment system. It includes an order entry device or system 10 for collecting information from users or customers regarding the services they wish to order. The user input to such a system 10 could be through a variety of means (not shown), such as a Web page, a telephone entry system, or a customer service representative. Other methods known or to be determined in the art can also be used. Entered user or customer orders are sent to a flow execution engine 12, such as a Workflow Engine, that is responsible for fulfilling the order.

As shown in FIG. 1, the Workflow Engine 12 has an associated Partner Selector mechanism or module 14 that is responsible for assembling a valid instance of the service based on the customer order. The Partner Selector 14 accesses the Component-Based Service Representation 18 to obtain a service specification 16 to use as a basis for the assembly of the order. The Partner Selector 14 also interacts with the Partner Component Offerings database 20 and the currently available Partner Component Systems 22 to select the partners 24 to supply components 26 for each order. In particular, the Partner Selector 14 queries the Partner Offerings database 20 to determine which partners generally provide the components that make up service(s) specified in the order. The Partner Selector 14 then queries the individual Partner Component Systems 22 of those identified partners to retrieve their current ability to offer the component.

When the Partner Selector 14 has completed the selection of partners for all components of the order, it creates a defined service instance that represents the service as provided by the selected set of partners. The Workflow Engine 12 then uses the defined service instance to determine the systems with which to interact to fulfill the order. In effect, the Workflow Engine 12 uses the partner information to fill in parameters in a pre-defined workflow template. The result would be a flow or executable workflow including calls and references to the chosen partners 24.

Figure 2:
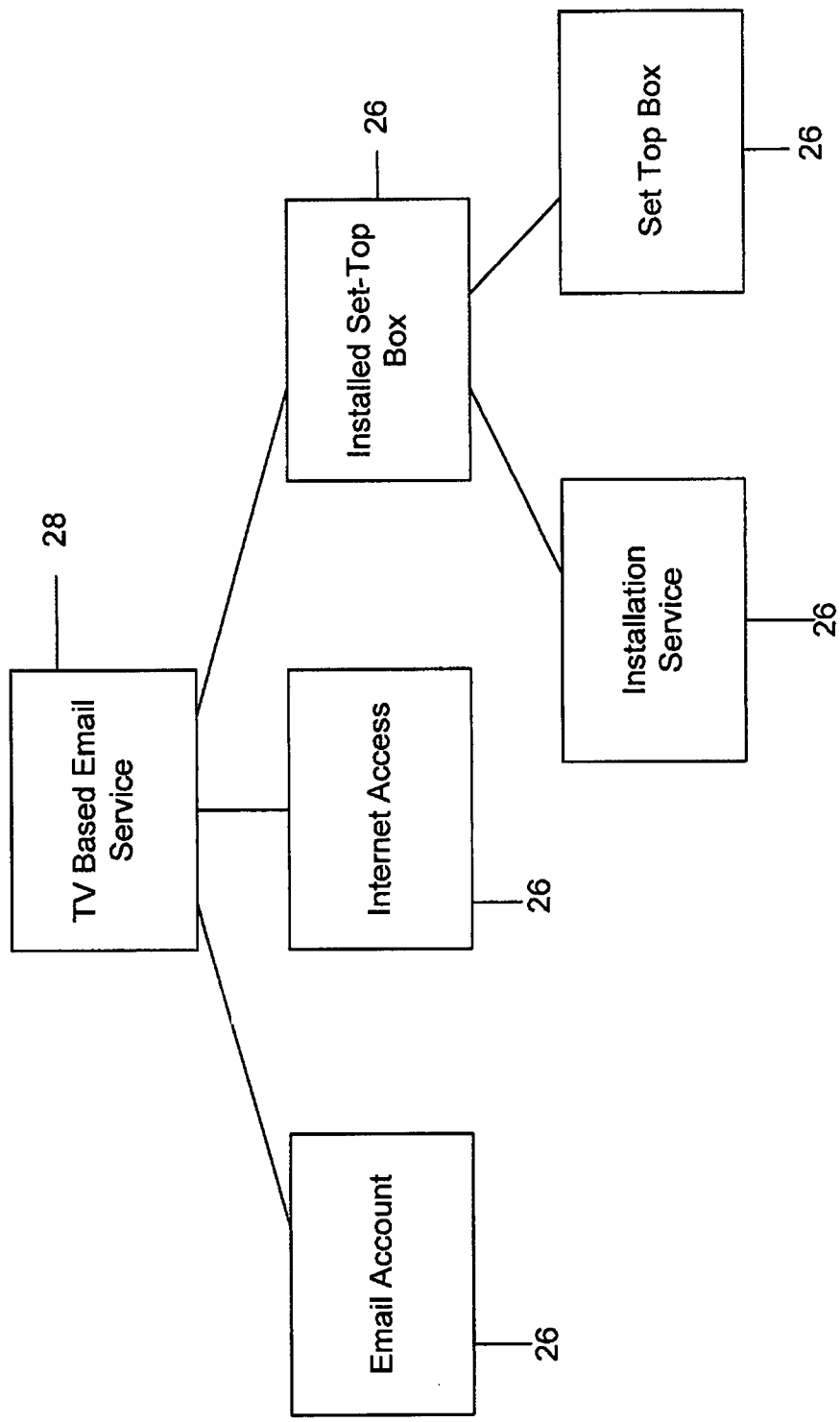
FIG. 2 illustrates a sample component-based service specification to support federated order fulfillment.

FIG. 2 provides a sample service specification 16 for a hypothetical service. The service 28 that is specified is a TV-based Email Service, where users can send and receive email using their televisions with a special set-top box. Each of the boxes under the TV-Based Email Service is a component 26 that could be provided by a partner 24 in creating a specific instance of this service in response to a customer order.

The mapping of the service components 26 to partner capabilities can vary from one customer order to the next. In addition, partners 24 can be selected at varying levels of the component hierarchy. For example, one partner 24 may offer a set-top box with delivery and installation as one component 26. An alternative equivalent would be two separate partners 24, one offering components 26 of set-top boxes and the other performing components 26 of installation services.

The selection of the specific partners 24 to fulfill a specific order is typically made after the order is received. Information in the order can be used to determine which partners 24 offer components 26 that meet the specific customer needs. Continuing the above example, the installation of the set-top box would have to be at the customer's home, so only those providers offering installation services in the customer's zip code would be considered. Note that the relevant parameters for identifying potential partners vary from component to component. For example, while zip code coverage is valid for an installation service, it is not appropriate for determining the ability to offer an email account.

The partners 24 can be queried to determine their specific ability to deliver the component 26. A partner's ability to deliver a component can be represented statically, e.g., operation in a zip code as above, but such static representation does not reflect the complete situation. One clear example is the delivery date; two partners offering installation services may cover a particular zip code, but one may have a back-log of two months while the other can schedule a delivery or an installation within two weeks.

The selection of partners 24 to supply components 26 can be optimized along several dimensions. The criteria described above deal primarily with the ability of a partner to deliver a component that meets the needs of the customer, as defined in the order. The selection of partners could also consider factors such as the partner's past performance (e.g., in delivering on time), to enhance customer satisfaction, or the price the partner charges, to enhance the financial arrangements for the service provider.

The workflow can be re-defined in response to feedback and failures by re-performing the partner selection process, which can be performed as many times as necessary. If a partner fails to meet a commitment date, the partner selection process can be performed again to determine the optimum manner in which to fulfill the order, potentially resulting in different partner choices.

Note that during the process of fulfilling an order, a customer may request a change to the order. When this happens, the system can determine an optimum method for handling the change, given the state of the process so far (e.g., which partners have committed to delivery, which are still pending). The determination of partners in case of such change orders would be a constrained partner selection process, where the current status represents additional constraints on the choices.

Another key point to note is that the concept of "order" is interpreted loosely here. In telecommunications, the process of ordering, for example telephone service, is separated from the delivery of the service. The order, which can be viewed as a subscription, initiates the delivery of service that will continue to be delivered over time. In such cases, the systems that process the orders are distinct and separate from the systems that deliver the service. In other environments, the ordering and delivery of the service can be merged. These services can be viewed as transaction-based services. For example, if the service is delivery of a digital content item, such as a ring tone, the end result of the order is the actual transmission of the ring tone to the end user. In the former, subscription-like case, the partners would be selected and instructed how to deliver the service to the customer, and would continue to deliver the service on an on-going basis. In the latter, transaction-like services, the partners would be selected and would deliver their portion of the service immediately, with no long-standing arrangement. Both of these options are considered here.

Figure 3:
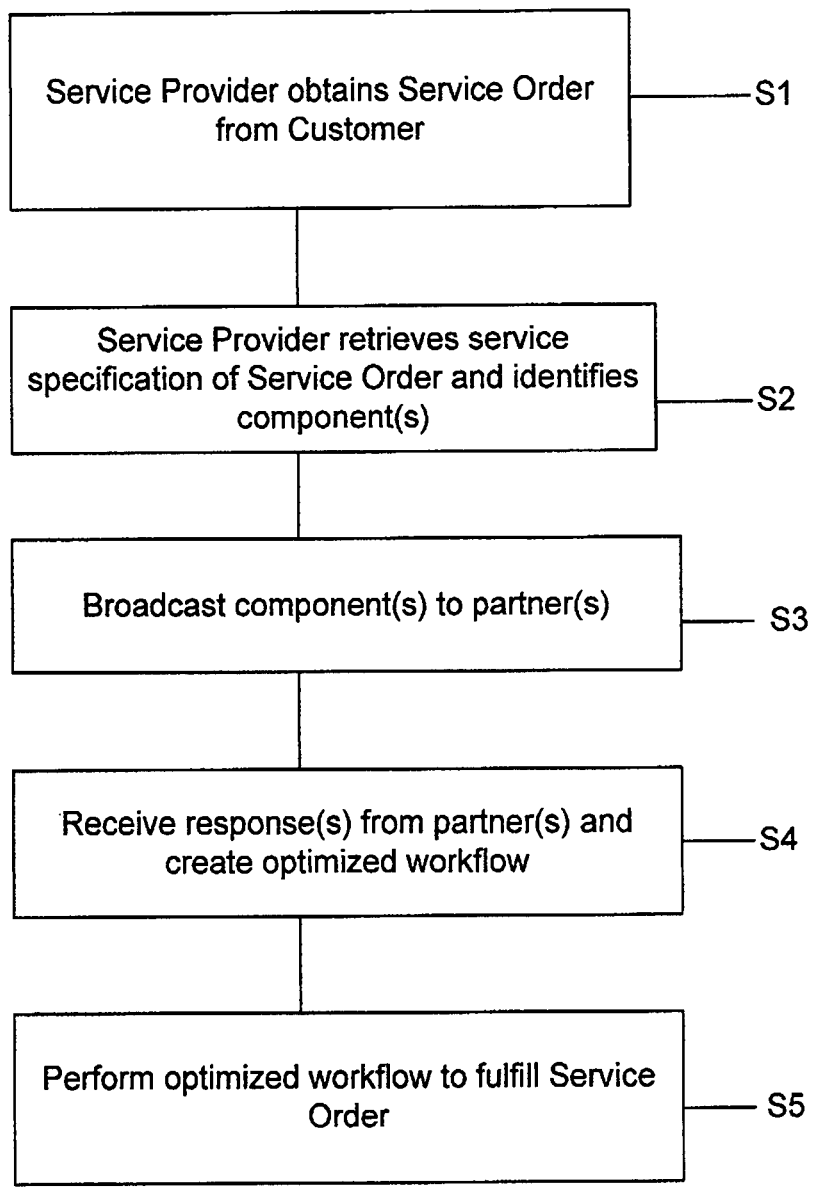
FIG. 3 is a flow chart illustrating an exemplary embodiment of the invention.

FIG. 3 illustrates the flow of an exemplary embodiment, in accordance with the architecture of FIG. 1. In step S1, a customer places an order for a service using the Order Entry System 10 of a service provider, and the Order Entry System 10 sends the order along with related customer information to the service provider's Workflow Engine 12. In step S2, the Workflow Engine 12 forwards the order to the Partner Selector 14 to get a service specification 16 from the Component-Based Service Representation 18, having one or more instances of the service, including listings of components 26, created by the Partner Selector 14. These instances, represent the potential set of solutions by each of the partners and may differ based on the level at which the components are specified, as in the set-top box with or without delivery example, are broadcast to partners 24 in step S3. In response to the broadcast, the service provider receives "bids" or offers to perform or supply one or more components of the service from the partners 24; the service provider can also submit its own bids based on its capabilities. These bids or offers are collected and optimized as a workflow in step S4. The Workflow Engine 12 executes the optimized workflow in step S5 and thus fulfills the order. Fulfillment of the order is monitored such that if an initial bid for a service component 26 from a partner 24 is not fulfilled as promised, a bid for the service component 26 from another partner 24 is selected to replace the initial one.

The set of actions that would occur in response to a customer order for the TV-Based Email Service is described as an example of the inventive process.

A customer enters an order for a TV-Based Email Service into a service provider's Order Entry System, which sends the order to the Workflow Engine. The order includes information such as the customer address, the customer's current Internet provider (if any), and the model number of the customer's current set-top box.

The Workflow Engine interprets the order, determines that it is for the TV-Based Email Service and asks the Partner Selector to create an instance of the service. The Partner Selector obtains the service specification for the TV-Based Email Service from the Component-Based Service Representation, interprets this specification and identifies its components.

Next, the Partner Selector queries the Partner Component Offering database and/or the Partner Component Systems to determine which partners can supply the required components based on the customer order. The information used for the query for each component is defined in the service specification and the customer order. For example, the query for the installation might include the customer's zip code to determine if the partner covers the required region while the query for the email account might include the customer requirement for an email box larger than 4 gigabytes.

The Partner Selector only queries for components needed to attain the service, as determined by queries to a customer inventory system. For example, if the user already has Internet access or a compatible set-top box, the Partner Selector does not need to query for those components.

Upon receipt of the responses to the queries, the Partner Selector assembles the identified components into one or more potential service offerings or instances. The offerings may be nominally equivalent, for example two offerings with the same email account partner and internet service partner, differing only in the installed set-top box partner. Alternatively, the offerings could be structurally different, with one having a single partner for the installed set-top box, and the other having separate partners for the set-top box and the installation service.

If there is no combination of partners that represents a complete set of components, the Partner Selector informs the Workflow Engine, which reports the error condition to the Order Entry System. There it could be handled in multiple ways, such as being addressed manually by a customer service representative or used to generate an automated information message to the customer.

Note that while the module is referred to as Partner Selector, it could also select components from capabilities offered by the service provider. Service providers wishing to give priority to the use of their own components could define the flow to look first to see if the service provider can offer each of the component capabilities to fulfill the customer order. For those components the service provider cannot provide, the module would proceed to identify potential partners. Alternatively, the service provider's components could be considered equally with the partner components in the selection process that follows.

The Partner Selector then uses rules contained within the components and the service definition to select one or more instances as being the best choice.

Rules can be designed to enhance customer satisfaction, for example by choosing partners who can deliver the components the soonest, or choosing the partners that have the best reputation for delivering as promised. Other rules can aim to select the combination that represents the best financial deal for the service provider, by picking the partners with the lowest costs. Interpretation of these rules may require queries to other systems (not shown), such as a partner management system that stores records of partner pricing agreements or service-level agreement monitors that track partner performance.

The Partner Selector delivers the selected instance to the Workflow Engine for processing. Note that the Partner Selector could select more than one service instance as being acceptable. These could be returned to the customer with information such as the delivery date in each case, to allow the customer to select one before the Workflow Engine proceeds to fulfill the order.

The Workflow Engine takes the generic flow associated with the service specification and uses the instance information to create a specific flow to fulfill the customer order. The specific flow fills in parameterized sections of the generic flow with information such as the interface and addresses to specific partner components and infrastructure elements.

The Workflow Engine executes the workflow, making calls to the partner components and to the service provider's infrastructure elements. In cases where the return messages from the partner's systems indicate exceptions, such as an inability to deliver the promised component at all or the expectation that the promised delivery date will not be met, the partner selection process can be performed again. If an alternative configuration of partners will provide a more desirable result, such as an earlier delivery date, the workflow can be modified to cancel unneeded components and implement this new selection.

While the present invention has been described in particular embodiments, it should be appreciated that the present invention should not be construed as limited by such embodiments, but rather construed according to the below claims.

What is claimed is:

1. An apparatus comprising:
   a engine configured to receive an order for a service or good;
   a component offerings database configured to store one or more components provided by one or more providers and provider information;
   a service representation database configured to create service specifications comprising listings of components for a given service or good;
   a supplier selector module configured to be in communication with the engine, the component offerings database, and the service representation database, said supplier selector module further configured to:
   receive the order from the engine;
   obtain from the service representation database a service specification comprising at least one component representing the order;
   search the component offerings database for provider information associated with an available provider identified as supplying the at least one component for the service or good;
   query a system of the available provider to determine a capability to supply the at least one component;
   confirm the ability of the available provider to supply the at least one component; and
   create a service instance representing the order as provided by the available provider;
   wherein the engine is further configured to:
   receive the service instance from the supplier selector module and use the service instance to fill parameters in a workflow to fulfill the order;
   receive a request from a customer to alter the order while fulfilling the order;
   determine a change to the order given a current state of fulfillment of the order; and
   in response to the determination of the change to the order given the current state of fulfillment of the order, perform a constrained provider selection process wherein the constrained provider selection process is constrained at least in part based on the current state of fulfillment of the order.

2. The apparatus of claim 1 wherein the supplier selector module is further configured to:
   search the component offerings database for provider information associated with providers identified as supplying the at least one component for the service or good;
   query systems of the providers to determine provider capability to supply the at least one component;
   receive a plurality of bids from the providers to supply the at least one component; and
   select one of the plurality of bids from the providers to supply the at least one component.

3. The apparatus of claim 2 wherein the supplier selector module configured to select one of the plurality of bids from the providers to supply the at least one component comprises the supplier selector module configured to select one of the plurality of bids from the providers to supply the at least one component based on at least one of a delivery time of the at least one component, a cost of that at least one component, an availability of the at least one component, or a performance metric of the providers.

4. The apparatus of claim 1 wherein the service specification comprises instructions regarding selection of a provider to supply the at least one component.

5. The apparatus of claim 1 wherein the available provider is configured to submit a bid to the supplier selector module to supply the at least one component.

6. The apparatus of claim 2 wherein the engine is configured to monitor fulfillment of the selected one of the plurality of bids to supply the at least one component; and
   the supplier selector module is further configured to select another of the plurality of bids from the providers to supply the at least one component in response to a determination that the selected bid was not fulfilled.

7. The apparatus of claim 1 wherein the engine is further configured to receive a plurality of instances of provider components sufficient to provide the service or good from the supplier selector module, receive a selection of one of the plurality of instances of provider components sufficient to provide the service or good, and create a workflow to fulfill the order in response to receiving the selection.

8. A method comprising:
   receiving an order for a service or good at a engine;
   storing components provided by one or more providers and provider information in a component offerings database;
   creating service specifications comprising listings of components for a given service or good in a service representation database;

a supplier selector module receiving the order from the engine;

the supplier selector module obtaining from the service representation database a service specification including at least one component representing the order;

the supplier selector module searching the component offerings database for provider information associated with an available provider identified as supplying the at least one component for the service or good;

the supplier selector module querying a system of the available provider to determine a capability to supply the at least one component;

the supplier selector module confirming the ability of the available provider to supply the at least one component;

the supplier selector module creating a service instance representing the order as provided by the available provider;

the engine receiving the service instance from the supplier selector module and using the service instance to fill parameters in a workflow to fulfill the order;

receiving a request from a customer to alter the order at the engine while fulfilling the order;

determine a change to the order given a current state of fulfillment of the order;

in response to the determination of the change to the order given the current state of fulfillment of the order, the supplier selector module performing a constrained provider selection process wherein the constrained provider selection process is constrained at least in part based on the current state of fulfillment of the order.

9. The method of claim 8 wherein searching the component offerings database for provider information associated with an available provider comprises searching the component offerings database for provider information associated with a plurality of available providers identified as supplying the at least one component for the service or good;

querying a system of the provider comprises querying systems of the plurality of available providers to determine provider capability to supply the at least one component;

further comprising receiving a plurality of bids from the available providers to supply the at least one component; and further comprising selecting one of the plurality of bids from the providers to supply the at least one component.

10. The method of claim 9 further comprising:

monitoring fulfillment of the selected one of the plurality of bids to supply the at least one component; and selecting another of the plurality of bids from the available providers to supply the at least one component in response to a determination that the selected bid was not fulfilled.

11. The method of claim 8 wherein receiving at least one instance of provider components sufficient to provide the service or good from the supplier selector module comprises receiving a plurality of instances of provider components sufficient to provide the service or good from the supplier selector module; and further comprising:

receiving a selection of one of the plurality of instances of provider components sufficient to provide the service or good; and creating a workflow to fulfill the order in response to receiving the selection.

12. The method of claim 8 further comprising the engine providing an error message in response to receiving at least one error message from the supplier selector module.

13. The apparatus of claim 1 wherein the engine is further configured to provide an error message in response to receiving at least one error message from the supplier selector module.

* * * * *